United States Patent
Birru

(10) Patent No.: US 7,079,613 B2
(45) Date of Patent: Jul. 18, 2006

(54) APPARATUS AND METHOD FOR USING TRAINING SEQUENCES TO ESTIMATE TIMING ERROR IN A DIGITAL SIGNAL RECEIVER

(75) Inventor: Dagnachew Birru, Yorktown Heights, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 948 days.

(21) Appl. No.: 10/144,820

(22) Filed: Oct. 25, 2001

(65) Prior Publication Data
US 2003/0081700 A1    May 1, 2003

(51) Int. Cl.
*H04L 7/00* (2006.01)

(52) U.S. Cl. .................... 375/354; 375/340
(58) Field of Classification Search ............. 375/354, 375/368, 365, 366; 327/141
See application file for complete search history.

(56) References Cited

U.S. PATENT DOCUMENTS

| | | | |
|---|---|---|---|
| 6,040,800 A * | 3/2000 | Raith et al. ............ | 342/387 |
| 6,184,829 B1 * | 2/2001 | Stilp ..................... | 342/387 |
| 2001/0046266 A1 * | 11/2001 | Rakib et al. ............ | 375/259 |
| 2002/0037028 A1 * | 3/2002 | Baltersee et al. ........ | 375/148 |

OTHER PUBLICATIONS

Heinrich Meyr, Marc Moeneclaey and Stefan Fechtel, "Digital Communication Receivers: Synchronization, Channel Estimation and Signal Processing", John Wiley and Sons, New York, 1998.*

* cited by examiner

Primary Examiner—Kevin Burd
Assistant Examiner—Juan Alberto Torres

(57) ABSTRACT

An apparatus and method is disclosed for estimating timing error in a digital signal receiver from a difference between an arrival time of a first training sequence and an arrival time of a second training sequence in the digital signal receiver. Time domain representations of the timing sequence data are converted into frequency domain representations and used to calculate a complex cross power spectrum. The timing error is obtained by determining an average phase of the complex cross power spectrum. The timing error is then used to calculate an accurate value for the clock rate of the digital signal transmitter.

36 Claims, 4 Drawing Sheets

APPARATUS AND METHOD FOR USING TRAINING SEQUENCES TO ESTIMATE TIMING ERROR IN A DIGITAL SIGNAL RECEIVER

TECHNICAL FIELD OF THE INVENTION

The present invention is directed, in general, to obtaining an estimate of timing error in a digital signal receiver and, more specifically, to an apparatus and method for using training sequences within data that is received from a digital signal transmitter to estimate timing error in a digital signal receiver.

BACKGROUND OF THE INVENTION

In digital communications a digital signal receiver must recover the clock frequency of the digital signal transmitter from information contained within the transmitted digital signal. This process is often referred to as timing recovery. In many applications, timing recovery is accomplished by extracting a timing error from the statistical properties of the received digital signal. When the transmitted digital signal is subject to severe interference such as channel noise and multipath, algorithms that depend upon the properties of the transmitted digital signal may fail to recover the timing information.

To facilitate timing recovery, a known sequence referred to as a "training sequence" is often transmitted at regular intervals as a part of the main data stream. Information from the training sequence aids the digital signal receiver in the recovery of the transmitted data. In the presence of severe interference, the quality of performance of the timing error detector will depend upon the particular algorithm that is used to extract the timing information from the training sequence. Prior art algorithms extract the timing information from a single training sequence. That is, recovery of the timing information is done using only one training sequence transmission to recover timing error. Prior art algorithms that use only a single training sequence in the timing error recovery process may not perform well in the presence of severe signal interference.

There is therefore a need in the art for an apparatus and method that is capable of utilizing information from more than one training sequence to extract timing error information in order to more accurately recover a clock rate of a digital signal transmitter in the presence of severe signal interference.

SUMMARY OF THE INVENTION

To address the deficiencies of the prior art mentioned above, the apparatus and method of the present invention utilizes information from a first training sequence and from a second training sequence to extract timing error information in order to more accurately recover a clock rate of a digital signal transmitter.

The apparatus and method of the present invention estimates timing error in a digital signal receiver from a difference between an arrival time of a first training sequence and an arrival time of a second training sequence in the digital signal receiver. A time domain representation of the data around the first timing sequence is converted into a frequency domain representation. A time domain representation of the data around the second timing sequence is also converted into a frequency domain representation. The frequency domain representation of the data around the first timing sequence and a complex conjugate of the frequency domain representation of the data around the second timing sequence are multiplied together to calculate a complex cross power spectrum. The timing error is obtained from an average phase of the complex cross power spectrum. The timing error is then used to calculate an accurate value for the clock rate of the digital signal transmitter.

It is an object of the present invention to provide an apparatus and method for utilizing information from more than one training sequence to extract timing error information in a digital signal receiver.

It is another object of the present invention to provide an apparatus and method for accurately recovering a clock rate of a digital transmitter in the presence of severe signal interference.

It is also an object of the present invention to provide an apparatus and method for utilizing a first training sequence and a second training sequence in a differential manner to accurately recover timing error information in a digital signal receiver.

It is another object of the present invention to provide an apparatus and method for calculating a complex cross power spectrum that may be used to obtain accurate timing error information in a digital signal receiver.

It is also an object of the present invention to provide an apparatus and method for determining an average phase of a complex cross power spectrum that may be used to obtain accurate timing error information in a digital signal receiver.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. The present invention for using training sequences to estimate timing error in a digital signal receiver may be used in any digital signal receiver that uses a training sequence.

In the description of the exemplary embodiment that follows, the present invention is integrated into, or is used in connection with, a timing recovery unit within a digital television receiver. The present invention is not limited to use in a digital television receiver. Those skilled in the art will recognize that the exemplary embodiment of the present invention may easily be modified for use in any type of digital receiver system that uses a timing sequence including, without limitation, digital television systems, set top boxes, digital storage devices, digital radio systems, and any type of digital system that utilizes a training sequence in a digital signal receiver. The term "digital receiver system" is used to refer to these types of equipment.

Figure 1:
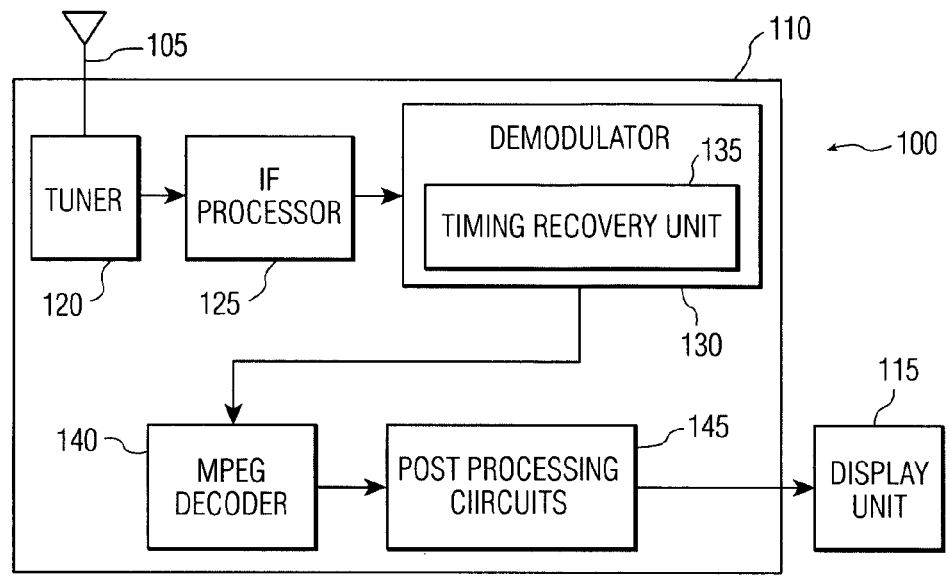
FIG. 1 is a block diagram of an exemplary digital television set comprising a timing recovery unit of the present invention.

FIG. 1 is a block diagram of a digital television set 100 that utilizes the apparatus and method of the present invention. Digital television set 100 comprises television receiver 110 and display unit 115. Display unit 115 may be a cathode ray tube or a flat panel display or any type of equipment for displaying video. Television receiver 110 comprises antenna 105 for receiving television signals. Antenna 105 is coupled to tuner 120. Tuner 120 is coupled to intermediate frequency ("IF") processor 125. IF processor 125 is coupled to demodulator 130. Demodulator 130 comprises timing recovery unit 135 of the present invention. The apparatus and method of the present invention recovers a value of a timing error from digital video signals within demodulator 130.

The output of demodulator 130 is coupled to MPEG decoder 140. The output of MPEG decoder 140 is coupled to post processing circuits 145. The output of post processing circuits 145 is provided as input to display unit 115.

Timing recovery unit 135 processes digital video signals that are received by demodulator 130 from IF processor 125. As shown in more detail in FIG. 2, timing recovery unit 135 comprises video processor 200. Video processor 200 receives video signals and analyzes the content of the video signals. Video processor 200 may store video signal components in memory unit 210.

Figure 2:
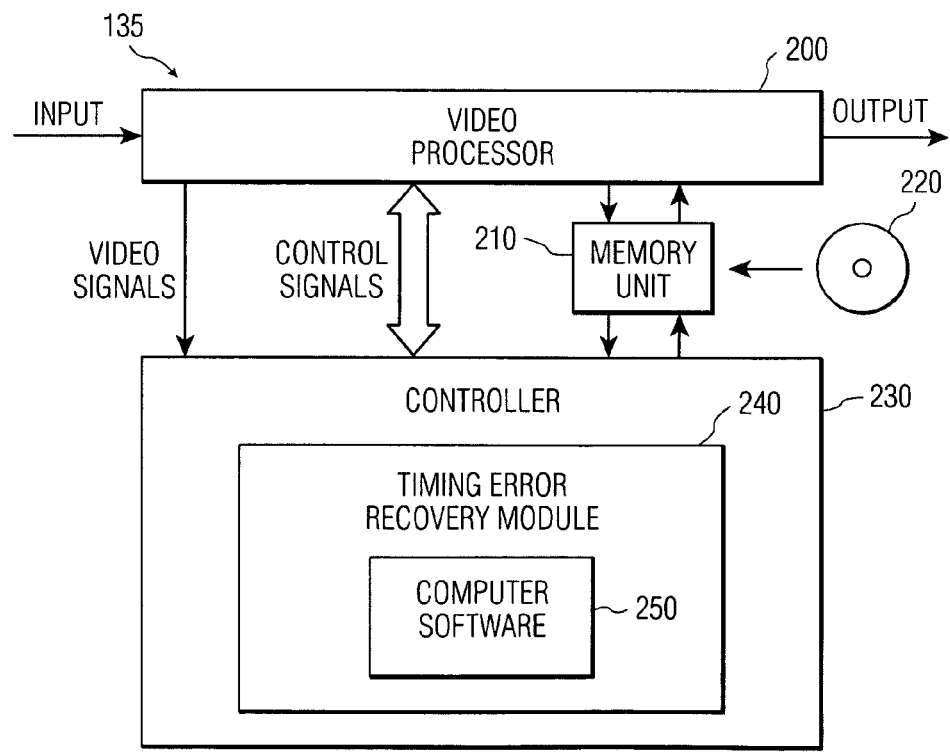
FIG. 2 is a block diagram showing a more detailed view of the timing recovery unit shown in FIG. 1.

Memory unit 210 may comprise random access memory (RAM) or a combination of random access memory (RAM) and read only memory (ROM). Memory unit 210 may comprise a non-volatile random access memory (RAM), such as flash memory. Memory unit 210 may comprise a mass storage data device, such as a hard disk drive (not shown). Memory unit 210 may also comprise an attached peripheral drive or removable disk drive (whether embedded or attached) that reads read/write DVDs or re-writable CD-ROMs. As illustrated in FIG. 2, removable disk drives or this type are capable of receiving and reading re-writable CD-ROM disk 220.

Video processor 200 provides video signals to controller 230 of the present invention. Controller 230 is capable of receiving control signals from video processor 200. Controller 230 is also capable of sending control signals to video processor 200. Controller 230 is also coupled to video processor 200 through memory unit 210. Video processor 200 and controller 230 operate using conventional operating system software (not shown).

As will be more fully described, controller 230 is capable of recovering a value of timing error using known training sequences that are present in the video signals. Controller 230 is also capable of storing within memory unit 210 information concerning the value of the timing error that occurs within the digital video signals. Video processor 200, in response to a user request, is capable of accessing timing error information stored within memory unit 210 and outputting the timing error information to display unit 115 (shown in FIG. 1).

Controller 230 contains timing error recovery module 240. Timing error recovery module 240 contains computer software 250 that is capable of executing the steps of the method of the present invention. Controller 230 and computer software 250 together comprise a timing error controller that is capable of carrying out the present invention. Under the direction of instructions in computer software 250 stored within controller 230 (or stored within memory unit 210), controller 230 is capable of detecting values of timing error in accordance with the method of the present invention. To understand the operation of controller 230 and computer software 250, one must understand how the method steps of the present invention are performed.

Controller 230 and timing error recovery module 240 receive video signal data from video processor 200. The received data includes a known training sequence that is periodically transmitted in the video signal data stream. The received data around the training sequence received at time $t_1$ can be described as:

$$y_1(t) = \Sigma a_k h_1(t-kT) + e_1(t) \quad (1)$$

where $a_k$ represents the training sequence and $h_1(t)$ represents the channel impulse response at time $t_1$. The term $e_1(t)$ represents an error term that accounts for channel noise and additive error due to multipath effects of the data that is transmitted before and after the training sequence is transmitted. The term T represents the clock period of the transmitter. Because the channel may be a time varying channel, the channel impulse h(t) may vary between the time of transmission of a first training sequence and the time of transmission of a subsequent training sequence.

The clock period T of the transmitter is not exactly known. However, the value of the clock period T is approximately known. Controller 230 assumes that the clock period of the transmitter is equal to $T_2$ where $T_2$ is a value that is approximately equal to the actual clock period T.

Controller 230 then samples the data of Equation (1) at a rate of $T_2$. The result of the sampling is:

$$y_1(nT_2) = \Sigma a_k h_1(nT_2 - kT) + e_1(nT_2) \quad (2)$$

If the value of $T_2$ is different from the value of T, then the receiver will not be synchronized with the transmitter clock. Then the transmitted data cannot be correctly recovered by the receiver.

Using the assumed clock period $T_2$ controller 230 can compute it the approximate time at which the next training sequence will be received. The next occurrence of the training sequence will ideally occur after the passage of a time period equal to M times T where the letter M represents the known number of symbols between each successive training sequence. This is because each symbol requires one clock period T for transmission. Controller 230 knows the exact value of M but does not know the exact value of T. However, controller 230 can calculate an approximate value for the next time of occurrence of a timing sequence by calculating a value that is equal to M times $T_2$.

The "timing error" is defined to be the time difference between the time period M times T and the time period M times $T_2$. The timing error is represented by the Greek letter "tau" ($\tau$):

$$\tau = MT - MT_2 = M(T - T_2) \quad (3)$$

Controller 230 then receives data around a subsequent training sequence received at time $t_2$. This data can be described as:

$$y_2(nT_2) = \Sigma a_k h_2(nT_2 - kT - \tau) + e_2(nT_2) \quad (4)$$

The value of the timing error $\tau$ is to be determined. After the value of the timing error $\tau$ is determined, then the value of the transmitter clock period T may be obtained from Equation (3) using the known values M and $T_2$.

The apparatus and method of the present invention employs a differential technique to determine the timing error $\tau$. The term "differential" refers to the fact that the apparatus and method of the present invention finds and utilizes the difference between the arrival time of a first training sequence and the arrival time of a subsequent training sequence.

If the channel is a dynamic channel, then the value of $h_1(t)$ will not be equal to the value of $h_2(t)$. However, for a channel that is changing relatively slowly with respect to the value of the timing error $\tau$, it may be assumed that $h_1(t)$ and $h_2(t)$ differ by a small amount. This may be represented as:

$$h_2(t) = h_1(t) + \Delta h(t) \quad (5)$$

where $\Delta h(t)$ represents the small amount by which $h_1(t)$ and $h_2(t)$ differ. Substituting Equation (5) into Equation (4) gives:

$$y_2(nT_2) = \Sigma a_k h_1(nT_2 - kT - \tau) + e_3(nT_2) \quad (6)$$

where $e_3(nT_2)$ is the sum of $e_2(nT_2)$ and a term that is equal to the convolution of $\Delta h(t)$ with the training sequence $a_k$. That is, $$e_3(nT_2) = e_2(nT_2) + (\Delta h(t) \otimes a_k) \quad (7)$$

where the symbol $\otimes$ represents the convolution operation.

In the frequency domain Equation (2) has the form:

$$Y_1(e^{j\omega}) = P(e^{j\omega}) + E_1(e^{j\omega}) \quad (8)$$

where the term $P(e^{j\omega})$ is a frequency domain representation of the summation term in Equation (2) that contains $h_1$. The term $E_1(e^{j\omega})$ is a frequency domain representation of the term $e_1(nT_2)$ in Equation (2).

In the frequency domain Equation (6) has the form:

$$Y_2(e^{j\omega}) = P(e^{j\omega}) e^{j\omega\tau} + E_3(e^{j\omega}) \quad (9)$$

where the term $P(e^{j\omega})$ is a frequency domain representation of the summation term in Equation (6) that contains $h_1$. The term $e^{j\omega\tau}$ is a frequency domain representation of the term in Equation (6) that contains the timing error $\tau$. The term $E_3(e^{j\omega})$ is a frequency domain representation of the term $e_3(nT_2)$ in Equation (6).

The complex cross power spectrum of the received signal may be calculated by multiplying $Y_1(e^{j\omega})$ by the complex conjugate of $Y_2(e^{j\omega})$. Specifically, $$Y_1(e^{j\omega})Y_2(e^{-j\omega}) = |P(e^{j\omega})|^2 e^{-j\omega\tau} + E_4(e^{j\omega}) \quad (10)$$

where $E_4(e^{\omega})$ is a frequency domain representation of terms that are functions of $e^{j\omega}$. The phase of the cross power density spectrum depends upon the value of the timing error $\tau$ and the value of $E_4(e^{j\omega})$.

When the phase of the cross power density spectrum of Equation (10) is considered, there are two (2) phase components that can be distinguished. The first phase component is a deterministic phase component that is due to the timing error $\tau$. The second phase component is a random phase component that is due to $E_4(e^{j\omega})$. The phase that is due to $E_4(e^{j\omega})$ and the phase that is due to the timing error $\tau$ cannot be directly added to obtain the total phase.

Because $E_4(e^{j\omega})$ can be assumed to be random, then the average phase contribution due to $E_4(e^{j\omega})$ can be assumed to be random with a negligible mean value of phase contribution. Therefore, the timing error $\tau$ can be obtained by finding the average phase of the cross power density spectrum of Equation (10).

In one advantageous embodiment of the present invention, the complex cross power spectrum can be calculated using Fast Fourier Transform (FFT) units. Assume that an N-point FFT unit is used to calculate a complex cross power spectrum Y(k). Then the timing error $\tau$ may be estimated by finding the average of the phase of each frequency bin in the FFT as follows:

$$\tau = C \sum_{k=1}^{N} \arg(Y(k))/k \quad (11)$$

where C is a scaling factor.

After the timing error $\tau$ has been determined, then the clock rate error (i.e., the difference between T and $T_2$) can be computed from Equation (3). Then the transmitter clock rate T can be determined because the value of $T_2$ is known.

In an alternate advantageous embodiment of the present invention, the value of the timing error $\tau$ may be determined using numerical differentiation. The numerical differentiation method uses the fact that differentiation of the angle of the cross power spectrum of Equation (10) with respect to ω yields an approximate value for the timing error τ. Therefore, the timing error τ may be obtained using the equation:

$$\tau = C \sum_{k=2}^{N} f(\arg(Y(k)) - \arg(Y(k-1))) \quad (12)$$

where C is a scaling factor and where f(·) is a function to compensate for the discontinuity due modulo 2π operations. Because angle modulation is typically in the range [-π, π], Equation (11) and Equation (12) are generally modulo 2π equations.

As a result, the estimate of the timing error τ may be wrapped to an erroneous estimate. In order to avoid this problem the estimate of the timing error τ may be unwrapped at each frequency bin of the FFT before the mean value of the timing error τ is calculated.

In another alternate advantageous embodiment of the present invention, the value of the timing error τ may be determined by first computing the cross correlation of $y_1(nT_2)$ of Equation (2) and of $y_2(nT_2)$ of Equation (6) in the time domain. Then the result of the cross correlation is provided to a FFT unit to obtain the complex cross power spectrum Y(k) in the frequency domain. The timing error is then determined from Y(k) using one of the methods described above.

Figure 3:
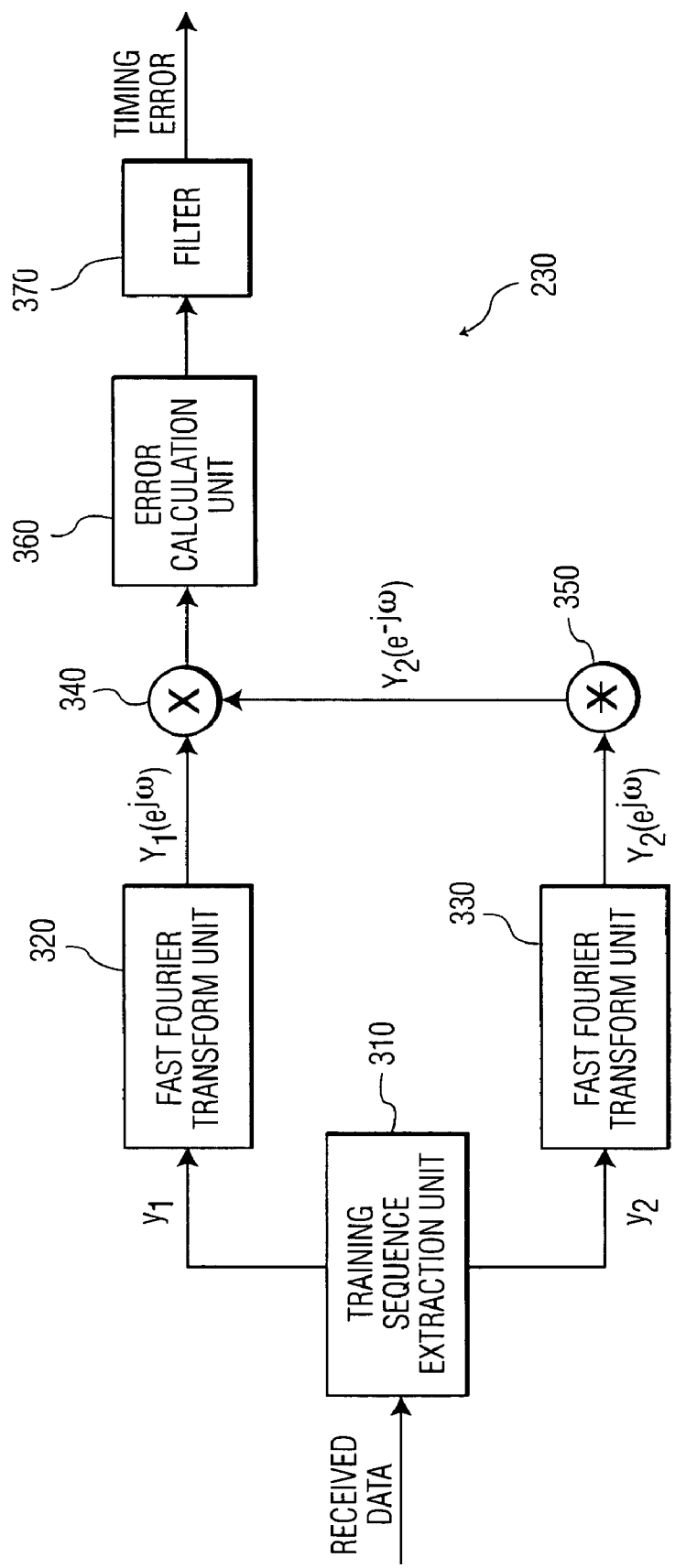
FIG. 3 is a block diagram showing a series of operations that are carried out in a timing error recovery module within the timing recovery unit of the present invention.

FIG. 3 is a block diagram showing the operations that are carried out in controller 230 within timing error recovery module 240. Controller 230 executes method steps stored within computer software 250 to perform the operations shown in FIG. 3. Training sequence extraction unit 310 receives data and extracts the data around the first training sequence received at time $t_1$. This data is designated as $y_1(nT_2)$. The $y_1(nT_2)$ data is provided to Fast Fourier Transform Unit 320 where the data is converted into the frequency domain. The output of Fast Fourier Transform Unit 320 for the $y_1(nT_2)$ data is $Y_1(e^{j\omega})$.

Training sequence extraction unit 310 receives data and extracts the data around a subsequent training sequence received at time $t_2$. This data is designated as $y_2(nT_2)$. The $y_2(nT_2)$ data is provided to Fast Fourier Transform Unit 330 where the data is converted into the frequency domain. The output of Fast Fourier Transform Unit 330 for the $y_2(nT_2)$ data is $Y_2(e^{j\omega})$.

The two Fast Fourier Transform units, 320 and 330, are shown as separate units in FIG. 3 for clarity. In an alternate advantageous embodiment of the present invention, Fast Fourier transform unit 320 and Fast Fourier transform unit 330 could be implemented in a single unit.

The output $Y_2(e^{j\omega})$ of Fast Fourier Transform unit 330 is converted to its complex conjugate value in conjugate unit 350. In multiplier unit 340 the output $Y_1(e^{j\omega})$ of Fast Fourier Transform unit 320 is multiplied by the complex conjugate value $Y_2(e^{-j\omega})$ from conjugate unit 350 to obtain the complex cross power spectrum $Y_1(e^{j\omega})Y_2(e^{-j\omega})$. The complex cross power spectrum is then provided to error calculation unit 360.

Error calculation unit 360 determines the timing error τ from the phase of the complex cross power spectrum in the manner previously described. The output of error calculation unit 360 is filtered in filter 370 to provide a timing error signal that represents the timing error τ. The transmitter clock rate T is then determined from the timing error τ in the manner previously described.

Figure 4:
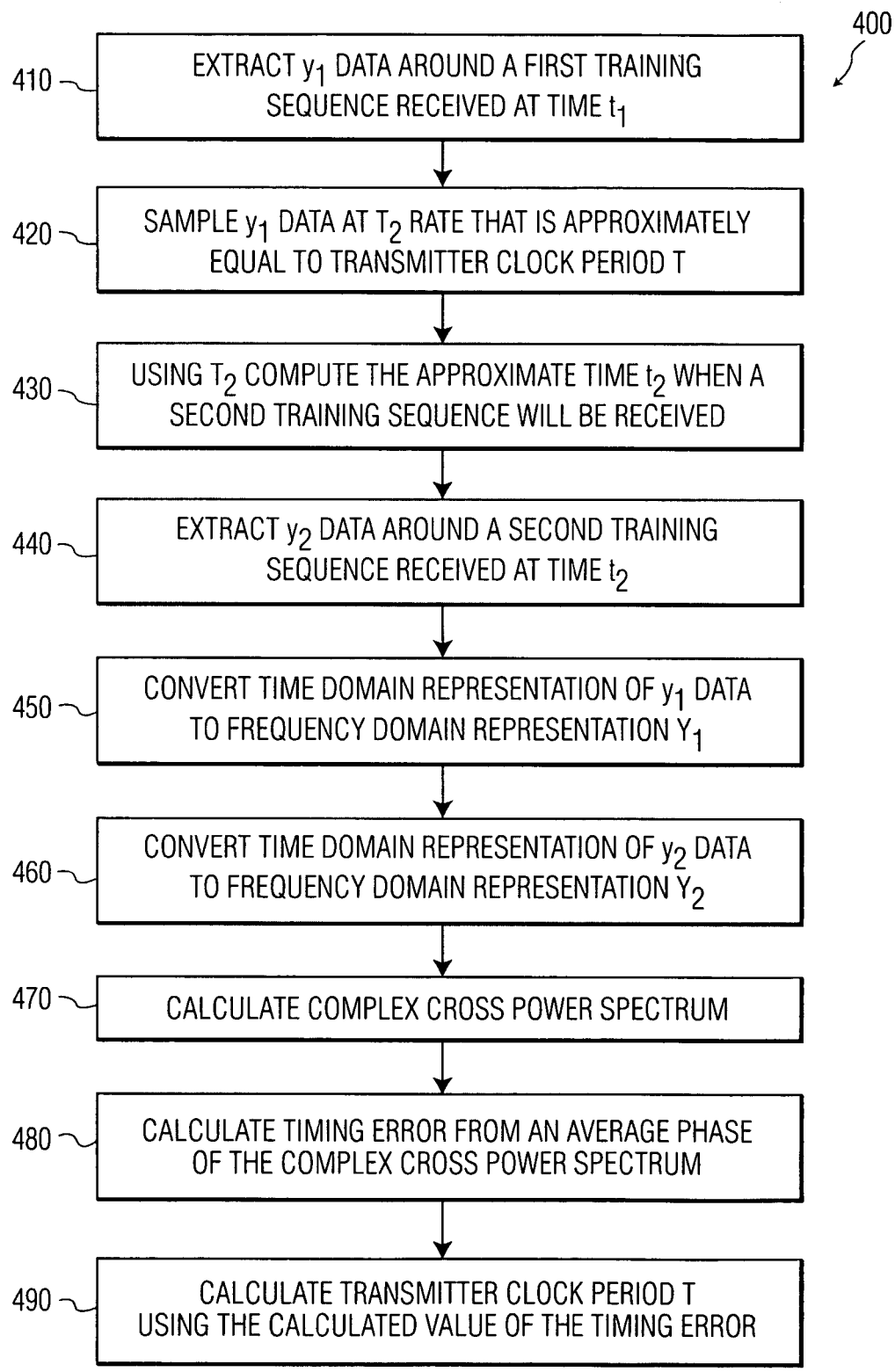
FIG. 4 illustrates a flowchart showing the steps of a method of one advantageous embodiment of the present invention.

FIG. 4 illustrates a flowchart showing the steps of a method of one advantageous embodiment of the present invention. The steps are collectively referred to with reference numeral 400.

Controller 230 receives data and extracts $y_1$ data around a first training sequence received at time $t_1$ (step 410). Controller 230 then samples the $y_1$ data at a $T_2$ rate that is approximately equal to the transmitter clock period T (step 420). Controller 230 then uses the $T_2$ data rate to compute an approximate value for a time $t_2$ when a second training sequence will be received (step 430). Then controller 230 extracts $y_2$ data around the second training sequence received at time $t_2$ (step 440).

Controller 230 converts the time domain representation of the $y_1$ data to a frequency domain representation $Y_1(e^{j\omega})$ (step 450). Controller 230 converts the time domain representation of the $y_2$ data to a frequency domain representation $Y_2(e^{j\omega})$ (step 460). In this description step 450 has been described as preceding step 460 for purposes of clarity. In practice step 450 and step 460 may be performed simultaneously.

Controller 230 then calculates the complex cross power spectrum by multiplying $Y_1(e^{j\omega})$ by the complex conjugate of $Y_2(e^{j\omega})$ in the manner previously described (step 470). Controller 230 then calculates the timing error τ from an average phase of the complex cross power spectrum (step 480). Lastly, controller 230 calculates the transmitter clock period T from the calculated value of the timing error τ and the known values of M and $T_2$ (step 490).

Figure 5:
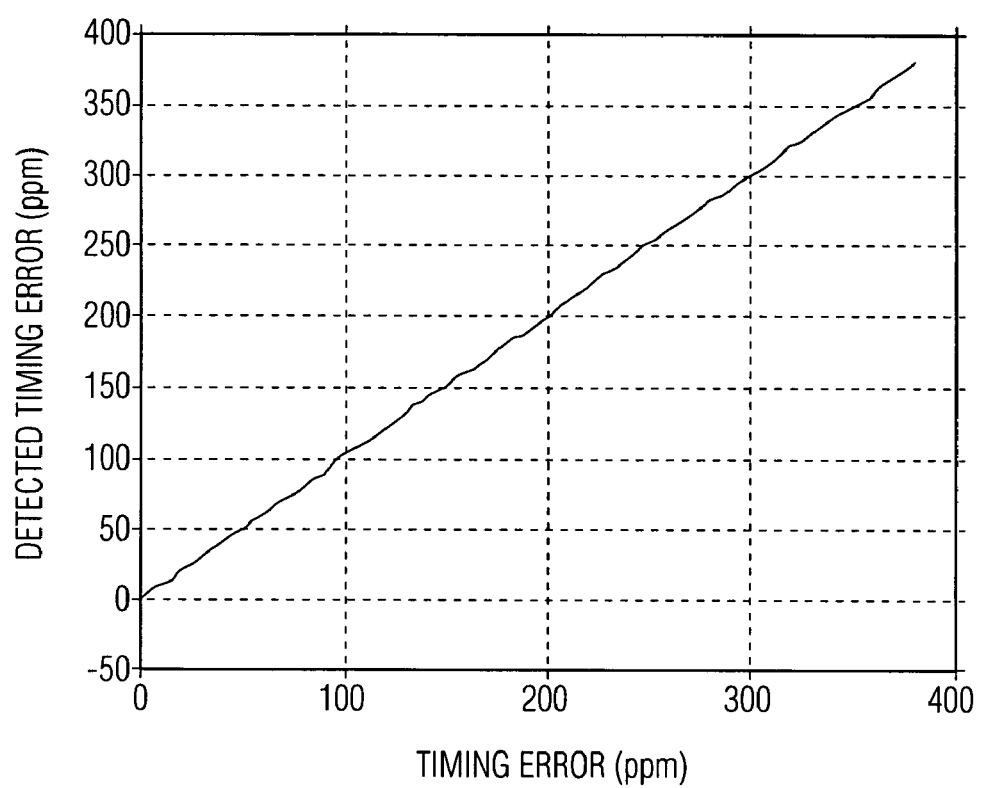
FIG. 5 illustrates a graph showing the results of a simulation in which detected timing error information obtained in accordance with the principles of the present invention is plotted versus actual timing error information.

FIG. 5 illustrates a graph showing the results of a simulation in which detected timing error information obtained in accordance with the principles of the present invention is plotted versus actual timing error information. The graph shown in FIG. 5 represents the results obtained from a simulation that was generated using the MATLAB code set forth below.

The simulation represented an ATSC 8-VSB digital television standard channel. In the ATSC 8-VSB standard one training sequence (or "field sync") of seven hundred (700) symbols in length is transmitted at regular intervals. Each field sync is separated by a number of symbols that is equal to 832 times 313. Therefore, the value of M (i.e., the known number of symbols between each successive training sequence) is equal to 260,416. The receiver assumes an approximate clock rate of the transmitter to be 10.76 MHz. This value corresponds to a value of $T_2$ equal to 92.9 nanoseconds.

FIG. 5 displays the results of simulations for several timing errors. For $h_1(t)$, the channel impulse response at time $t_1$, the simulation used a value of [1 0 −1 0 0.5]. For $h_2(t)$, the channel impulse response at time $t_2$, the simulation used a value that is equal to the sum of $h_1(t)$ and a random component to simulate a dynamic channel. Then each point is produced using a different value for $h_2(t)$. For example, at one point in the simulation the value of $h_2(t)$ was [0.603 −0.096 −1.082 −0.1782 0.885]. A random noise component was also added to provide a ten decibel (10 dB) signal to noise ratio (SNR).

As may been seen with reference to FIG. 5, the method of the present invention provides very good recovery of the timing error. A timing error accuracy of approximately five parts per million (5 ppm) was typically observed. The timing error at each frequency bin was detected using numerical differentiation. The angle of computation was pre-filtered using a simple moving average filter to reduce the effect of channel impairments.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. An apparatus for determining an estimate of timing error in a digital signal receiver, said apparatus comprising a timing error controller that is capable of determining said estimate of timing error from a difference between an arrival time of a first training sequence and an arrival time of a second training sequence in said digital signal receiver, wherein said timing error controller is capable of extracting $y_1$ data around said first training sequence received at time $t_1$ where said $y_1$ data is represented by:

$$y_1(t) = \Sigma a_k h_1(t-kT) + e_1(t)$$

where $a_k$ represents said training sequence, $h_1(t)$ represents a channel impulse response at time $t_1$, $e_1(t)$ represents an error term, and T represents a clock period of a transmitter; and wherein said timing error controller is capable of sampling said $y_1$ data at a rate $T_2$ that is approximately equal to said value T of said clock period of said transmitter to obtain sampled $y_1$ data represented by:

$$y_1(nT_2) = \Sigma a_k h_1(nT_2-kT) + e_1(nT_2).$$

2. An apparatus as claimed in claim 1 wherein said timing error controller is capable of calculating an arrival time $t_2$ of said second training sequence, and capable of extracting $y_2$ data around said second training sequence received at time $t_2$ where said $y_2$ data is represented by:

$$y_2(nT_2) = \Sigma a_k h_2(nT_2-kT-\tau) + e_2(nT_2)$$

where $a_k$ represents said training sequence, $h_2(t)$ represents a channel impulse response at time $t_2$, $e_2(nT_2)$ represents an error term, T represents a clock period of said transmitter, and $\tau$ represents said timing error.

3. An apparatus as claimed in claim 2 wherein said timing error controller is capable of obtaining said $y_2(nT_2)$ data in terms of said channel impulse response $h_1(t)$ at time $t_1$, where said $y_2(nT_2)$ data is represented by:

$$y_2(nT_2) = \Sigma a_k h_1(nT_2-kT-\tau) + e_3(nT_2)$$

where $e_3(nT_2)$ represents an error term that is equal to $e_2(nT_2)$ plus $\Delta h(t) \otimes a_k$ where $\Delta h(t)$ is a difference between $h_1(t)$ and $h_2(t)$, and where $\otimes$ represents a convolution operation.

4. An apparatus as claimed in claim 3 wherein said timing error controller is capable of converting a time domain representation of $y_1(nT_2) = \Sigma a_k h_1(nT_2-kT) + e_1(nT_2)$ to a frequency domain representation $Y_1(e^{j\omega}) = P(e^{j\omega}) + E_1(e^{j\omega})$ where $P(e^{j\omega})$ is a frequency domain representation of $\Sigma a_k h_1(nT_2-kT)$ and where $E_1(e^{j\omega})$ is a frequency domain representation of the term $e_1(nT_2)$; and where said timing error controller is capable of converting a time domain representation of $y_2(nT_2) = \Sigma a_k h_1(nT_2-kT-\tau) + e_3(nT_2)$ to a frequency domain representation $Y_2(e^{j\omega}) = P(e^{j\omega})e^{j\omega\tau} + E_3(e^{j\omega})$ where $P(e^{j\omega})e^{j\omega\tau}$ is a frequency domain representation of $\Sigma a_k h_1(nT_2-kT-\tau)$ and where $E_3(e^{j\omega})$ is a frequency domain representation of the term $e_3(nT_2)$.

5. An apparatus as claimed in claim 4 wherein said timing error controller is capable of multiplying said frequency domain representation $Y_1(e^{j\omega})$ by a complex conjugate of said frequency domain representation $Y_2(e^{j\omega})$ to calculate a complex cross power spectrum equal to:

$$Y_1(e^{j\omega})Y_2(e^{-j\omega}) = |P(e^{j\omega})|^2 e^{-j\omega\tau} + E_4(e^{j\omega})$$

where $E_4(e^{j\omega})$ is a frequency domain representation of terms that are functions of $e^{j\omega}$.

6. An apparatus as claimed in claim 5 wherein said timing error controller is capable of determining a value of said timing error $\tau$ by determining an average phase of said complex cross power spectrum.

7. An apparatus as claimed in claim 6 wherein said timing error controller is capable of determining said value of said timing error $\tau$ by finding an average of a phase of each frequency bin in an N-point Fast Fourier Transform (FFT) unit that calculates said complex cross power spectrum Y(k) by calculating:

$$\tau = C \sum_{k=1}^{N} \arg(Y(k))/k$$

where C is a scaling factor.

8. An apparatus as claimed in claim 6 wherein said timing error controller is capable of determining said value of said timing error $\tau$ by finding an average of a phase of each frequency bin in an N-point Fast Fourier Transform (FFT) unit that calculates said complex cross power spectrum Y(k) by calculating:

$$\tau = C \sum_{k=2}^{N} f(\arg(Y(k)) - \arg(Y(k-1)))$$

where C is a scaling factor and where f(•) is a function to compensate for a discontinuity due to modulo $2\pi$ operations.

9. An apparatus as claimed in claim 6 wherein said timing error controller is capable of determining a value T of said transmitter clock period using: $\tau = MT - MT_2 = M(T-T_2)$ where said value of said timing error $\tau$ is known, and where M represents a known number of symbols between said first training sequence and said second training sequence, and where $T_2$ represents a known value of an approximate value of said transmitter clock period T.

10. A digital receiver system comprising an apparatus for determining an estimate of timing error in a digital signal receiver of said digital receiver system, said apparatus comprising a timing error controller that is capable of determining said estimate of timing error from a difference between an arrival time of a first training sequence and an arrival time of a second training sequence in said digital signal receiver, wherein said timing error controller is capable of extracting $y_1$ data around said first training sequence received at time $t_1$ where said $y_1$ data is represented by:

$$y_1(t) = \Sigma a_k h_1(t-kT) + e_1(t)$$

where $a_k$ represents said training sequence, $h_1(t)$ represents a channel impulse response at time $t_1$, $e_1(t)$ represents an error term, and T represents a clock period of a transmitter; and wherein said timing error controller is capable of sampling said $y_1$ data at a rate $T_2$ that is approximately equal to said value T of said clock period of said transmitter to obtain sampled $y_1$ data represented by:

$$y_1(nT_2)=\Sigma a_k h_1(nT_2-kT)+e_1(nT_2).$$

11. A digital receiver system as claimed in claim 10 wherein said timing error controller is capable of calculating an arrival time $t_2$ of said second training sequence, and capable of extracting $y_2$ data around said second training sequence received at time $t_2$ where said $y_2$ data is represented by:

$$y_2(nT_2)=\Sigma a_k h_2(nT_2-kT-\tau)+e_2(nT_2)$$

where $a_k$ represents said training sequence, $h_2(t)$ represents a channel impulse response at time $t_2$, $e_2(nT_2)$ represents an error term, T represents a clock period of said transmitter, and $\tau$ represents said timing error.

12. A digital receiver system as claimed in claim 11 wherein said timing error controller is capable of obtaining said $y_2(nT_2)$ data in terms of said channel impulse response $h_1(t)$ at time $t_1$, where said $y_2(nT_2)$ data is represented by:

$$y_2(nT_2)=\Sigma a_k h_1(nT_2-kT-\tau)+e_3(nT_2)$$

where $e_3(nT_2)$ represents an error term that is equal to $e_2(nT_2)$ plus $\Delta h(t) \otimes a_k$ where $\Delta h(t)$ is a difference between $h_1(t)$ and $h_2(t)$, and where $\otimes$ represents a convolution operation.

13. A digital receiver system as claimed in claim 12 wherein said timing error controller is capable of converting a time domain representation of $y_1(nT_2)=\Sigma a_k h_1(nT_2-kT)+e_1(nT_2)$ to a frequency domain representation $Y_1(e^{j\omega})=P(e^{j\omega})+E_1(e^{j\omega})$ where $P(e^{j\omega})$ is a frequency domain representation of $\Sigma a_k h_1(nT_2-kT)$ and where $E_1(e^{j\omega})$ is a frequency domain representation of the term $e_1(nT_2)$; and where said timing error controller is capable of converting a time domain representation of $y_2(nT_2)=\Sigma a_k h_1(nT_2-kT-\tau)+e_3(nT_2)$ to a frequency domain representation $Y_2(e^{j\omega})=P(e^{j\omega})e^{j\omega\tau}+E_3(e^{j\omega})$ where $P(e^{j\omega})e^{j\omega\tau}$ is a frequency domain representation of $\Sigma a_k h_1(nT_2-kT-\tau)$ and where $E_3(e^{j\omega})$ is a frequency domain representation of the term $e_3(nT_2)$.

14. A digital receiver system as claimed in claim 13 wherein said timing error controller is capable of multiplying said frequency domain representation $Y_1(e^{j\omega})$ by a complex conjugate of said frequency domain representation $Y_2(e^{j\omega})$ to calculate a complex cross power spectrum equal to:

$$Y_1(e^{j\omega})Y_2(e^{-j\omega})=|P(e^{j\omega})|^2 e^{-j\omega\tau}+E_4(e^{j\omega})$$

where $E_4(e^{j\omega})$ is a frequency domain representation of terms that are functions of $e^{j\omega}$.

15. A digital receiver system as claimed in claim 14 wherein said timing error controller is capable of determining a value of said timing error $\tau$ by determining an average phase of said complex cross power spectrum.

16. A digital receiver system as claimed in claim 15 wherein said timing error controller is capable of determining said value of said timing error $\tau$ by finding an average of a phase of each frequency bin in an N-point Fast Fourier Transform (FFT) unit that calculates said complex cross power spectrum Y(k) by calculating:

$$\tau = C\sum_{k=1}^{N} \arg(Y(k))/k$$

where C is a scaling factor.

17. A digital receiver system as claimed in claim 15 wherein said timing error controller is capable of determining said value of said timing error $\tau$ by finding an average of a phase of each frequency bin in an N-point Fast Fourier Transform (FFT) unit that calculates said complex cross power spectrum Y(k) by calculating:

$$\tau = C\sum_{k=2}^{N} f(\arg(Y(k)) - \arg(Y(k-1)))$$

where C is a scaling factor and where f(•) is a function to compensate for a discontinuity due to modulo $2\pi$ operations.

18. A digital receiver system as claimed in claim 15 wherein said timing error controller is capable of determining a value T of said transmitter clock period using: $\tau=MT-MT_2=M(T-T_2)$ where said value of said timing error $\tau$ is known, and where M represents a known number of symbols between said first training sequence and said second training sequence, and where $T_2$ represents a known value of an approximate value of said transmitter clock period T.

19. A method for determining an estimate of timing error in a digital signal receiver, said method comprising the step of:

determining said estimate of timing error from a difference between an arrival time of a first training sequence and an arrival time of a second training sequence in said digital signal receiver, wherein said step of determining said estimate of timing error comprises the steps of:

extracting $y_1$ data around said first training sequence received at time $t_1$ where said $y_1$ data is represented by:

$$y_1(t)=\Sigma a_k h_1(t-kT)+e_1(t)$$

where $a_k$ represents said training sequence, $h_1(t)$ represents a channel impulse response at time $t_1$, $e_1(t)$ represents an error term, and T represents a clock period of a transmitter; and sampling said $y_1$ data at a rate $T_2$ that is approximately equal to said value T of said clock period of said transmitter to obtain sampled $y_1$ data represented by:

$$y_1(nT_2)=\Sigma a_k h_1(nT_2-kT)+e_1(nT_2).$$

20. A method as claimed in claim 19 further comprising the steps of:

calculating an arrival time $t_2$ of said second training sequence; and extracting $y_2$ data around said second training sequence received at time $t_2$ where said $y_2$ data is represented by:

$$y_2(nT_2)=\Sigma a_k h_2(nT_2-kT-\tau)+e_2(nT_2)$$

where $a_k$ represents said training sequence, $h_2(t)$ represents a channel impulse response at time $t_2$, $e_2(nT_2)$ represents an error term, T represents a clock period of said transmitter, and $\tau$ represents said timing error.

21. A method as claimed in claim 20 further comprising the step of:

obtaining said $y_2(nT_2)$ data in terms of said channel impulse response $h_1(t)$ at time $t_1$, where said $y_2(nT_2)$ data is represented by:

$$y_2(nT_2)=\Sigma a_k h_1(nT_2-kT-\tau)+e_3(nT_2)$$

where $e_3(nT_2)$ represents an error term that is equal to $e_2(nT_2)$ plus $\Delta h(t) \otimes a_k$ where $\Delta h(t)$ is a difference between $h_1(t)$ and $h_2(t)$, and where $\otimes$ represents a convolution operation.

22. A method as claimed in claim 21 further comprising the steps of:
converting a time domain representation of $y_1(nT_2) = \Sigma a_k h_1(nT_2-kT) + e_1(nT_2)$ to a frequency domain representation $Y_1(e^{j\omega}) = P(e^{j\omega}) + E_1(e^{j\omega})$ where $P(e^{j\omega})$ is a frequency domain representation of $\Sigma a_k h_1(nT_2-kT)$ and where $E_1(e^{j\omega})$ is a frequency domain representation of the term $e_1(nT_2)$; and
converting a time domain representation of $y_2(nT_2) = \Sigma a_k h_1(nT_2-kT-\tau) + e_3(nT_2)$ to a frequency domain representation $Y_2(e^{j\omega}) = P(e^{j\omega})e^{j\omega\tau} + E_3(e^{j\omega})$ where $P(e^{j\omega})e^{j\omega\tau}$ is a frequency domain representation of $\Sigma a_k h_1(nT_2-kT-\tau)$ and where $E_3(e^{j\omega})$ is a frequency domain representation of the term $e_3(nT_2)$.

23. A method as claimed in claim 22 further comprising the step of:
multiplying said frequency domain representation $Y_1(e^{j\omega})$ by a complex conjugate of said frequency domain representation $Y_2(e^{j\omega})$ to calculate a complex cross power spectrum equal to:

$$Y_1(e^{j\omega})Y_2(e^{-j\omega}) = |P(e^{j\omega})|^2 e^{-j\omega\tau} + E_4(e^{j\omega})$$

where $E_4(e^{j\omega})$ is a frequency domain representation of terms that are functions of $e^{j\omega}$.

24. A method as claimed in claim 23 further comprising the step of:
determining a value of said timing error $\tau$ by determining an average phase of said complex cross power spectrum.

25. A method as claimed in claim 24 wherein said step of determining a value of said timing error $\tau$ comprises the step of:
finding an average of a phase of each frequency bin in an N-point Fast Fourier Transform (FFT) unit that calculates said complex cross power spectrum $Y(k)$ by calculating:

$$\tau = C\sum_{k=1}^{N} \arg(Y(k))/k$$

where C is a scaling factor.

26. A method as claimed in claim 24 wherein said step of determining a value of said timing error $\tau$ comprises the step of:
finding an average of a phase of each frequency bin in an N-point Fast Fourier Transform (FFT) unit that calculates said complex cross power spectrum $Y(k)$ by calculating:

$$\tau = C\sum_{k=2}^{N} f(\arg(Y(k)) - \arg(Y(k-1)))$$

where C is a scaling factor and where $f(\cdot)$ is a function to compensate for a discontinuity due to modulo $2\pi$ operations.

27. A method as claimed in claim 24 further comprising the step of:
determining a value T of said transmitter clock period using: $\tau = MT - MT_2 = M(T-T_2)$ where said value of said timing error $\tau$ is known, and where M represents a known number of symbols between said first training sequence and said second training sequence, and where $T_2$ represents a known value of an approximate value of said transmitter clock period T.

28. A computer executable process steps, stored on a computer readable storage medium, for determining an estimate of timing error in a digital signal receiver comprising the step of:
determining said estimate of timing error from a difference between an arrival time of a first training sequence and an arrival time of a second training sequence in said digital signal receiver, wherein said step of determining said estimate of timing error comprises the steps of:
extracting $y_1$ data around said first training sequence received at time $t_1$ where said $y_1$ data is represented by:

$$y_1(t) = \Sigma a_k h_1(t-kT) + e_1(t)$$

where $a_k$ represents said training sequence, $h_1(t)$ represents a channel impulse response at time $t_1$, $e_1(t)$ represents an error term, and T represents a clock period of a transmitter; and
sampling said $y_1$ data at a rate $T_2$ that is approximately equal to said value T of said clock period of said transmitter to obtain sampled $y_1$ data represented by:

$$y_1(nT_2) = \Sigma a_k h_1(nT_2-kT) + e_1(nT_2).$$

29. The computer executable process steps, stored on a computer readable medium, as claimed in claim 28 further comprising the steps of:
calculating an arrival time $t_2$ of said second training sequence; and
extracting $y_2$ data around said second training sequence received at time $t_2$ where said $y_2$ data is represented by:

$$y_2(nT_2) = \Sigma a_k h_2(nT_2-kT-\tau) + e_2(nT_2)$$

where $a_k$ represents said training sequence, $h_2(t)$ represents a channel impulse response at time $t_2$, $e_2(nT_2)$ represents an error term, T represents a clock period of said transmitter, and $\tau$ represents said timing error.

30. The computer executable process steps, stored on a computer readable medium, as claimed in claim 29 further comprising the step of:
obtaining said $y_2(nT_2)$ data in terms of said channel impulse response $h_1(t)$ at time $t_1$, where said $y_2(nT_2)$ data is represented by:

$$y_2(nT_2) = \Sigma a_k h_1(nT_2-kT-\tau) + e_3(nT_2)$$

where $e_3(nT_2)$ represents an error term that is equal to $e_2(nT_2)$ plus $\Delta h(t) \otimes a_k$ where $\Delta h(t)$ is a difference between $h_1(t)$ and $h_2(t)$, and where $\otimes$ represents a convolution operation.

31. The computer executable process steps, stored on a computer readable medium, as claimed in claim 30 further comprising the steps of:
converting a time domain representation of $y_1(nT_2) = \Sigma a_k h_1(nT_2-kT) + e_1(nT_2)$ to a frequency domain representation $Y_1(e^{j\omega}) = P(e^{j\omega}) + E_1(e^{j\omega})$ where $P(e^{j\omega})$ is a frequency domain representation of $\Sigma a_k h_1(nT_2-kT)$ and where $E_1(e^{j\omega})$ is a frequency domain representation of the term $e_1(nT_2)$; and
converting a time domain representation of $y_2(nT_2) = \Sigma a_k h_1(nT_2-kT-\tau) + e_3(nT_2)$ to a frequency domain representation $Y_2(e^{j\omega}) = P(e^{j\omega})e^{j\omega\tau} + E_3(e^{j\omega})$ where $P(e^{j\omega})e^{j\omega\tau}$ is a frequency domain representation of $\Sigma a_k h_1(nT_2-kT-\tau)$ and where $E_3(e^{j\omega})$ is a frequency domain representation of the term $e_3(nT_2)$.

32. The computer executable process steps, stored on a computer readable medium, as claimed in claim 31 further comprising the step of:

multiplying said frequency domain representation $Y_1(e^{j\omega})$ by a complex conjugate of said frequency domain representation $Y_2(e^{j\omega})$ to calculate a complex cross power spectrum equal to:

$$Y_1(e^{j\omega})Y_2(e^{-j\omega})=|P(e^{j\omega})|^2 e^{-j\omega\tau}+E_4(e^{j\omega})$$

where $E_4(e^{j\omega})$ is a frequency domain representation of terms that are functions of $e^{j\omega}$.

33. The computer executable process steps, stored on a computer readable medium, as claimed in claim 32 further comprising the step of:
  determining a value of said timing error $\tau$ by determining an average phase of said complex cross power spectrum.

34. The computer executable process steps, stored on a computer readable medium, as claimed in claim 33 wherein said step of determining a value of said timing error $\tau$ comprises the step of:
  finding an average of a phase of each frequency bin in an N-point Fast Fourier Transform (FFT) unit that calculates said complex cross power spectrum Y(k) by calculating:

$$\tau = C\sum_{k=1}^{N} \arg(Y(k))/k$$

where C is a scaling factor.

35. The computer executable process steps, stored on a computer readable medium, as claimed in claim 33 wherein said step of determining a value of said timing error $\tau$ comprises the step of:
  finding an average of a phase of each frequency bin in an N-point Fast Fourier Transform (FFT) unit that calculates said complex cross power spectrum Y(k) by calculating:

$$\tau = C\sum_{k=2}^{N} f(\arg(Y(k)) - \arg(Y(k-1)))$$

where C is a scaling factor and where $f(\cdot)$ is a function to compensate for a discontinuity due to modulo $2\pi$ operations.

36. The computer executable process steps, stored on a computer readable medium, as claimed in claim 33 further comprising the step of:
  determining a value T of said transmitter clock period using: $\tau = MT - MT_2 = M(T-T_2)$ where said value of said timing error $\tau$ is known, and where M represents a known number of symbols between said first training sequence and said second training sequence, and where $T_2$ represents a known value of an approximate value of said transmitter clock period T.

* * * * *